United States Patent Office 3,341,438
Patented Sept. 12, 1967

3,341,438
PROCESS FOR THE PREPARATION OF TERE- AND ISOPHTHALIC ACID DICHLORIDE
Ewald Katzschmann, Dortmund-Kruckel, Germany, assignor to Chemische Werke Witten G.m.b.H., Witten (Ruhr), Germany
No Drawing. Filed Mar. 13, 1963, Ser. No. 264,758
Claims priority, application Germany, Apr. 7, 1962, C 26,694
3 Claims. (Cl. 204—158)

The present invention relates to an improved process for the preparation of tere- and isophthalic acid dichloride, and more particularly to such a process wherein the sublimation which normally occurs is avoided.

German Patent 1,064,495 describes a process for the preparation of aromatic carboxylic acid chlorides by chlorination of the benzoic acid methyl ester or its nuclear substitution products with chlorine in the presence of light at a temperature of from 100 to 220° C., preferably 150 to 180° C.

According to the above-mentioned process, most methyl esters of the carboxylic acids may be reacted to the corresponding acid chlorides without difficulty in an excellent yield. A disturbing sublimation, however, is observed during the treatment or processing according to the afore-mentioned method of operation of isophthalic acid dimethyl esters and also particularly of terephthalic acid dimethyl esters. This sublimation occurs particularly at the beginning and toward the end of the reaction. While it is possible to reduce such sublimation by a low working temperature at the beginning of the reaction, such a temperature decrease has an unfavorable influence on the reaction velocity. The difficulties caused by the sublimation may, furthermore, be mitigated by the use of mechanical devices, such as the so-called sublimate traps. However, when such devices are used, a total reaction of the batch will not be brought about and additionally the recovery of the sublimate involves considerable technical difficulties.

It has now been found that the disturbing sublimation which arises during the use of iso- and terephthalic acid dimethyl esters in the preparation of acid chlorides, which may lead to obstructions of the waste gas line, is eliminated when low quantities of a liquid chloride or methyl ester of an aromatic monocarboxylic acid having a boiling point within the range of the reaction temperature is added to the iso- or terephthalic acid dimethyl ester. Benzoyl chloride or benzoic acid methyl ester may be added to the chlorination batch with particular advantage. When employing the benzoic acid methyl ester, benzoyl chloride is obtained simultaneously with the desired aromatic dicarboxylic acid dichloride.

The addition of the afore-mentioned chlorides and, respectively, methyl esters of aromatic monocarboxylic acids should be made in amounts of about 2 to 10% by weight, based on the amount of iso- or terephthalic acid dimethyl ester employed.

It is the primary object of the present invention, therefore, to provide a process for avoiding the sublimation normally occurring in the production of terephthalic and isophthalic acid dichlorides by chlorination of the corresponding dimethyl ester.

Other objects will become apparent as the description proceeds hereinbelow wherein the Examples serve to illustrate the process without limiting the same.

In a continuous production, the benzoyl chloride obtained is separated by distillation from the end product and added to a new batch. A strict separation of the benzoyl chloride is not required therefor so that the use of complicated apparatus may be avoided. In some instances, for example, when a distillation of the main product is not intended, it may be advisable to decant the benzoyl chloride from the chlorination vessel at the end of the chlorination reaction.

Example I 1,261 g. of terephthalic acid dimethyl ester was heated to 150° C. in a cylindrical glass vessel and chlorine was introduced through a frit in the bottom thereof at a velocity of 0.3 l./min. The space above the liquid reaction material is filled with crystals of the starting material which begin to deposit on the colder parts of the vessel. The waste gas line becomes gradually clogged and can, after some time, be maintained free only by heating and melting-down the sublimate. Half-way through the reaction, the sublimate distinctly abates and creates no difficulties for several hours. The sublimation of the acid chloride, however, starts again toward the end of the reaction but has a slightly less disturbing effect than at the beginning of the reaction.

The batch was chosen as described above and 50 g. benzoyl chloride, 4% by weight, was added thereto. The velocity of the chlorine introduction could now be doubled without the occurrence of sublimation. Moreover, it was possible to increase the temperature to 185° C. more rapidly than was possible without the addition of benzoyl chloride. After 8 hours, the chlorine introduction was reduced to 0.4 l./min., corresponding to the absorption, and to 0.1 l./min. toward the end of the reaction. A total of 2,138 g. chlorine was introduced.

No sublimation was noticed either at the beginning or through the end of the reaction. The yield of the reaction product amounted to 1,368 g. 82 g. was distilled off at from 87 to 138° C. (13 mm.). This preliminary run consisted of benzoyl chloride and was permeated with crystals of terephthaloyl chloride. The preliminary run was added to a further batch with the same success. The main fraction passed over at from 140 to 142° C. at 13 mm. 1,245 g. of terephthaloyl chloride was obtained, i.e., 95% of the theoretical yield. 37 g. of a liquid, orange-colored substance remained as residue which may be directly added to another batch.

Example II 500 g. of terephthalic acid dimethyl ester and 35 g. of benzoic acid methyl ester were treated jointly with chlorine, as described in Example I. No sublimation was observed. The yield amounted to 570 g. 33.5 g. of pure benzoyl chloride and 12 g. of a crystalline preliminary run could be separated by distillation. 96.7% of the theoretical yield of terephthaloyl chloride was obtained as the main fraction.

Example III 250 g. of isophthalic acid dimethyl ester was heated to 180° C. in a cylindrical glass vessel. Chlorine was introduced at a velocity of 0.4 l./min. through a glass frit in the bottom of the vessel. As a result of sublimation, which is distinctly weaker than in the reaction of terephthalic acid dimethyl ester, a deposit of dimethyl isophthalate is formed on the colder parts of the vessel and in the waste gas line. Midway through the reaction, the sublimation stops but leads again to deposits on the cold parts of the apparatus toward the end of the reaction.

A second batch was carried out as described above with the addition of 5 g. of benzoyl chloride, 2% by weight of the initial charge.

No sublimation whatever could be observed. The apparatus and the waste gas line remained absolutely free from deposits. The treatment of the reaction product offered no difficulties. At the end of the reaction, nitrogen was passed through the liquid acid chloride for removing the dissolved chlorine and the cleavage products and the benzoyl chloride employed was expelled at 190° C.

While the invention has been described with reference to a number of examples thereof, it will be understood that changes may be made in carrying out the process without departing from the scope of the invention, and it is intended that all matter contained in the above description shall be interpreted as illustrative and not in a limiting sense.

I claim:

1. A process for preventing sublimation in the production of terephthalic acid dichloride and isophthalic acid dichloride, by the chlorination of the corresponding terephthalic or isophthalic acid dimethyl ester in the presence of light at a temperature of between approximately 100° and 220° C., which comprises conducting said chlorination in the presence of benzoyl chloride.

2. A process as defined in claim 1, wherein said benzoyl chloride is used in an amount of between approximately 2 and 10% by weight, based on the amount of dimethyl ester employed.

3. A process as defined in claim 1, wherein said temperature is between 150° and 180° C.

References Cited

UNITED STATES PATENTS 2,865,959  12/1958  Toland _____ 204—158

HOWARD S. WILLIAMS, *Primary Examiner.*

JOHN H. MACK, *Examiner.*